US010181760B2

(12) United States Patent
Zeine et al.

(10) Patent No.: US 10,181,760 B2
(45) Date of Patent: Jan. 15, 2019

(54) TECHNIQUES FOR AUTHENTICATING DEVICES IN WIRELESS POWER DELIVERY ENVIRONMENTS

(71) Applicant: Ossia Inc., Bellevue, WA (US)

(72) Inventors: Hatem Zeine, Bellevue, WA (US); Benjamin Todd Renneberg, Redmond, WA (US); Fady El-Rukby, Redmond, WA (US)

(73) Assignee: Ossia Inc., Bellevue, WA (US)

( * ) Notice: Subject to any disclaimer, the term of this patent is extended or adjusted under 35 U.S.C. 154(b) by 126 days.

(21) Appl. No.: 15/297,721

(22) Filed: Oct. 19, 2016

(65) Prior Publication Data

US 2017/0110910 A1 Apr. 20, 2017

Related U.S. Application Data

(60) Provisional application No. 62/243,625, filed on Oct. 19, 2015.

(51) Int. Cl.
*H02J 50/80* (2016.01)
*H02J 7/02* (2016.01)
*H02J 7/00* (2006.01)
*H02J 50/27* (2016.01)
*H02J 50/23* (2016.01)

(52) U.S. Cl.
CPC ............ *H02J 50/80* (2016.02); *H02J 7/0004* (2013.01); *H02J 7/025* (2013.01); *H02J 50/23* (2016.02); *H02J 50/27* (2016.02); *H02J 2007/0001* (2013.01)

(58) Field of Classification Search
CPC ....................................................... H02J 50/80
USPC ........................................................ 308/104
See application file for complete search history.

(56) References Cited

U.S. PATENT DOCUMENTS

2012/0268238 A1* 10/2012 Park ...................... G07F 15/006
340/5.8

* cited by examiner

*Primary Examiner* — Joseph Chang

(57) ABSTRACT

Techniques are described for authenticating device in wireless power delivery environments. In some embodiments, a request for energy delivery is received from devices. The request may include an identifier, e.g., a client identification (ID). The charger may query a remotely located authentication platform via a network with the client ID. The authentication platform compares the client ID against devices that have been registered within the system. If the device is properly provisioned, the authentication platform may return an acceptance of authentication to the charger. In addition to device authentication, the current disclosure covers the ability to control the environment within a wireless network, and perform system diagnostics by monitoring the network environment.

20 Claims, 18 Drawing Sheets

900

COTA Admin

User Name

Password

User Type

Forgot your password? Click here

Login

COTA Admin Registration Page

User Name

Name (Full Name)

Old Password

New Password

Confirm Password

Phone Number

User Type

Cancel    Submit

*FIG. 10*

# TECHNIQUES FOR AUTHENTICATING DEVICES IN WIRELESS POWER DELIVERY ENVIRONMENTS

CROSS-REFERENCE TO RELATED APPLICATIONS

This application claims priority to and benefit from U.S. Provisional Patent Application Ser. No. 62/243,625, titled "SYSTEMS AND METHODS FOR AUTHENTICATION IN A WIRELESS CHARGING ENVIRONMENT," filed on Oct. 19, 2015, which is expressly incorporated by reference herein.

TECHNICAL FIELD

The technology described herein relates generally to the field of wireless power transmission and, more specifically, to techniques for authenticating devices in wireless power delivery environments.

BACKGROUND

Many electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to derive power for electronics wirelessly.

Magnetic or induction based coupling requires a charger and the receiver to be in relatively close proximity to one another. Wireless charging of devices across a larger distance, however, requires more advanced mechanisms, such as transmission via radio frequency (RF) signals, ultrasonic transmissions, laser powering, etc., each of which present a number of unique hurdles to commercial success.

Regardless of the transmission medium, any time energy is transferred through a free space, such as within a residence, commercial building, or other habited environments, it is desirable to limit the exposure levels of the transmitted signals. Power delivery is constrained to relatively low power levels (typically on the order of milliwatts). Due to this low energy transfer rate, it is imperative that a wireless power transmission system be as efficient as possible.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

FIG. 9 depicts an example screenshot illustrating an administrative login interface 900 for an authentication system, in accordance with some embodiments.

FIG. 10 depicts an example screenshot illustrating an administrative device registration interface for an authentication system, in accordance with some embodiments

DETAILED DESCRIPTION

Figure 1:
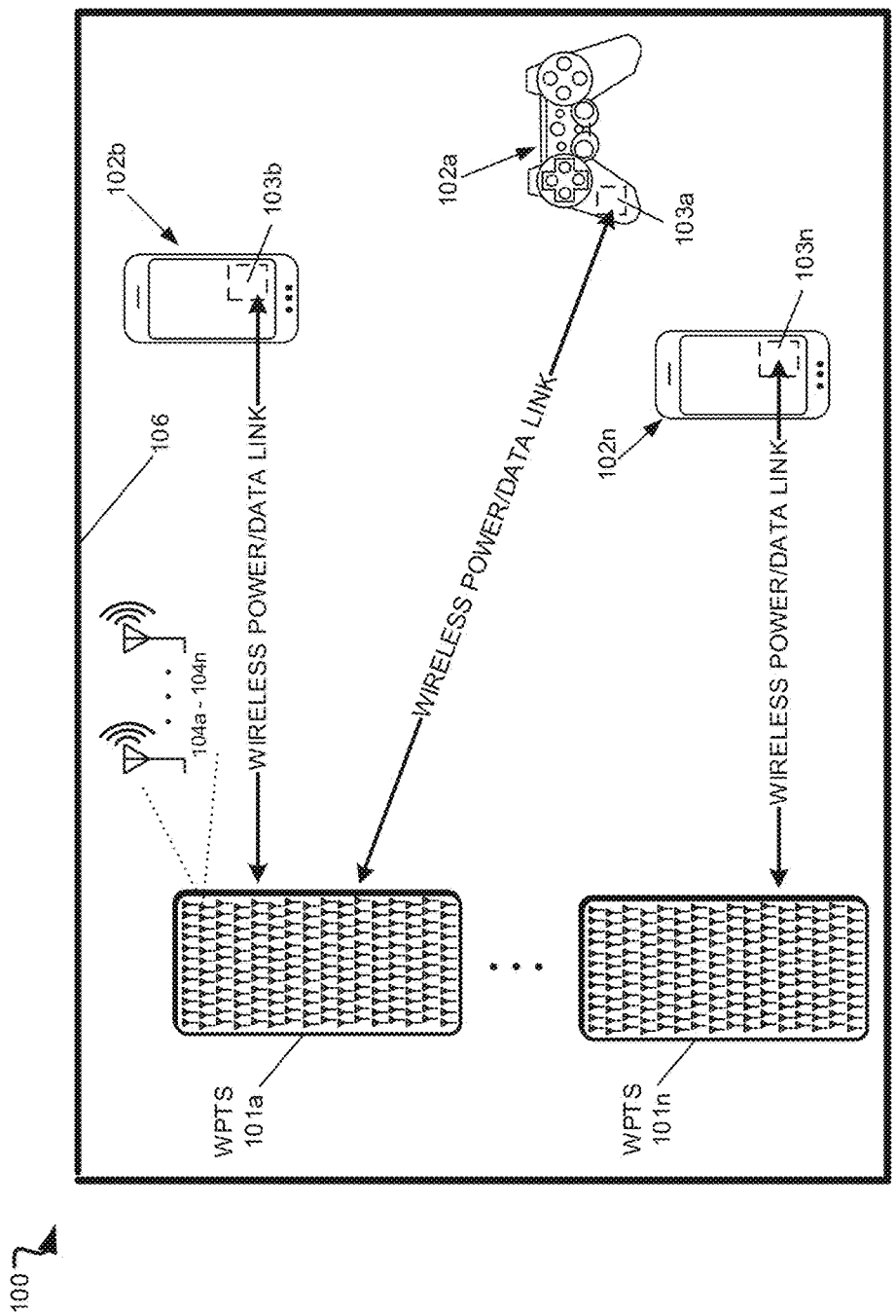
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Any headings provided herein are for convenience only and do not necessarily affect the scope or meaning of the claimed invention.

I. Wireless Power Transmission System Overview/Architecture

FIG. 1 depicts a block diagram including an example wireless power delivery environment 100 illustrating wireless power delivery from one or more wireless power transmission systems (WPTS) 101a-n (also referred to as "wireless power delivery systems", "antenna array systems" and "wireless chargers") to various wireless devices 102a-n within the wireless power delivery environment 100, according to some embodiments. More specifically, FIG. 1 illustrates an example wireless power delivery environment 100 in which wireless power and/or data can be delivered to available wireless devices 102a-102n having one or more wireless power receiver clients 103a-103n (also referred to herein as "clients" and "wireless power receivers"). The wireless power receiver clients are configured to receive and process wireless power from one or more wireless power transmission systems 101a-101n. Components of an example wireless power receiver client 103 are shown and discussed in greater detail with reference to FIG. 4.

As shown in the example of FIG. 1, the wireless devices 102a-102n include mobile phone devices and a wireless game controller. However, the wireless devices 102a-102n can be any device or system that needs power and is capable of receiving wireless power via one or more integrated wireless power receiver clients 103a-103n. As discussed herein, the one or more integrated wireless power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102. In some embodiments, the antennas are adaptively-phased radio frequency (RF) antennas. The wireless power transmission system 101 is capable of determining the appropriate phases with which to deliver a coherent power transmission signal to the wireless power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more wireless power receiver clients 103. As illustrated in the example of FIG. 1, power delivery antennas 104a-104n are shown. The power delivery antennas 104a are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the wireless power receiver clients 103a-103n and/or the wireless devices 102a-102n. In some embodiments, the data communication antennas can communicate via Bluetooth™, Wi-Fi™, ZigBee™, etc. Other data communication protocols are also possible.

Each wireless power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each the wireless power transmission systems 101a-101n is capable of determining the appropriate phases for delivering the coherent signals to the wireless power receiver clients 102a-102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary alternating current (AC) power supply in a building. Alternatively, or additionally, one or more of the wireless power transmission systems 101a-101n can be powered by a battery or via other mechanisms, e.g., solar cells, etc.

The wireless power receiver clients 102a-102n and/or the wireless power transmission systems 101a-101n are configured to operate in a multipath wireless power delivery environment. That is, the wireless power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the wireless power receiver clients 103a-103n.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the wireless power receiver clients 103a-103n can each include a data communication module for communication via a data channel Alternatively, or additionally, the wireless power receiver clients 103a-103n can direct the wireless devices 102a-102n to communicate with the wireless power transmission system via existing data communications modules. In some embodiments the beacon signal, which is primarily referred to herein as a continuous waveform, can alternatively or additionally take the form of a modulated signal.

Figure 2:
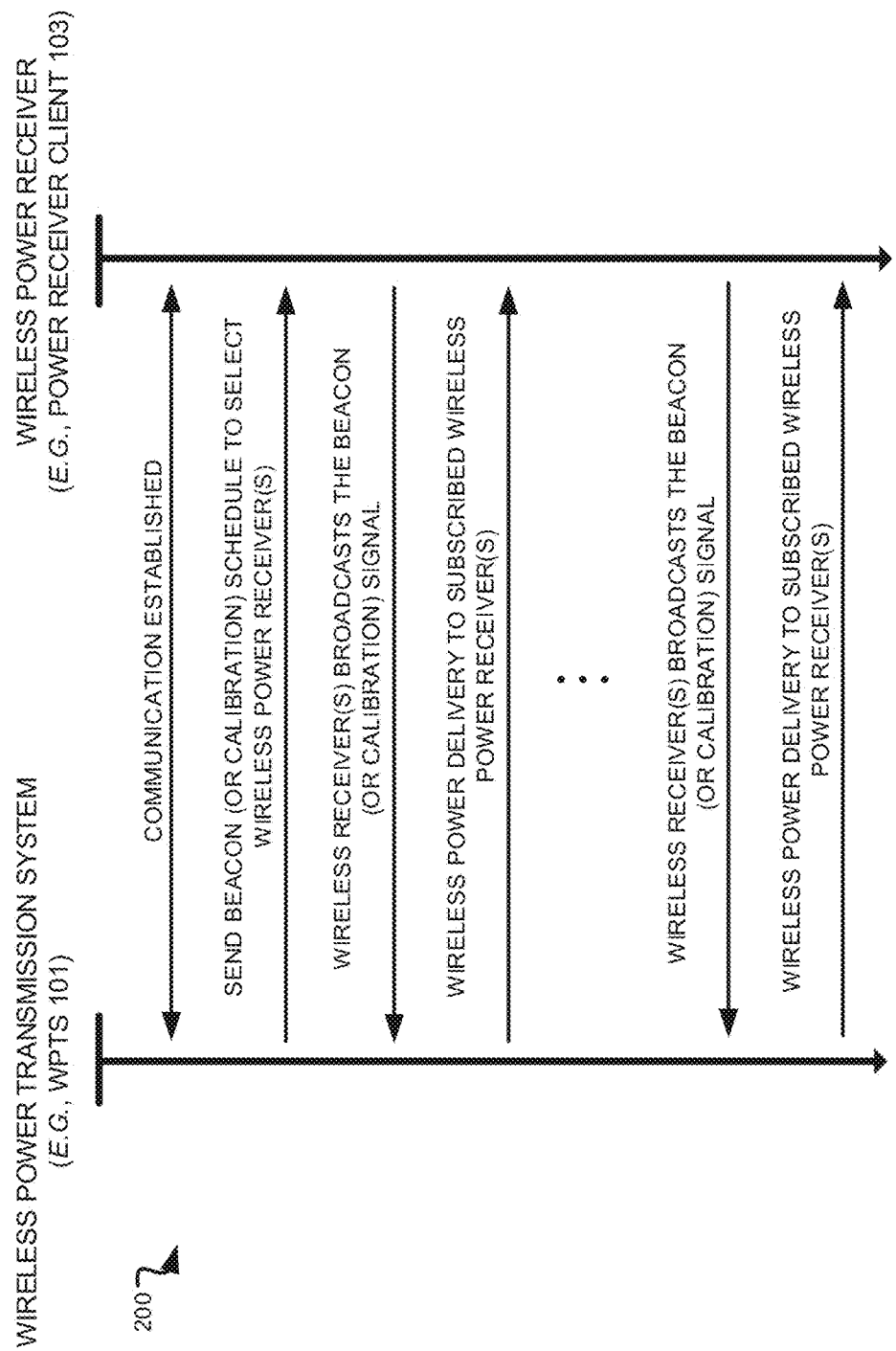
FIG. 2 depicts a sequence diagram illustrating example operations between a wireless power transmission system and a wireless receiver client for commencing wireless power delivery in accordance with some embodiments.

FIG. 2 depicts a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select wireless power receiver clients 103. The wireless power transmission system 101 can also send power transmission scheduling information so that the wireless power receiver client 103 knows when to expect (e.g., a window of time) wireless power from the wireless power transmission system. The wireless power receiver client 103 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 103 includes one or more antennas (or transceivers) which have a radiation and reception pattern in three-dimensional space proximate to the wireless device 102 in which the wireless power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the wireless power receiver client 103 via the same path over which the beacon signal was received from the wireless power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the wireless power receiver clients via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client 103 at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
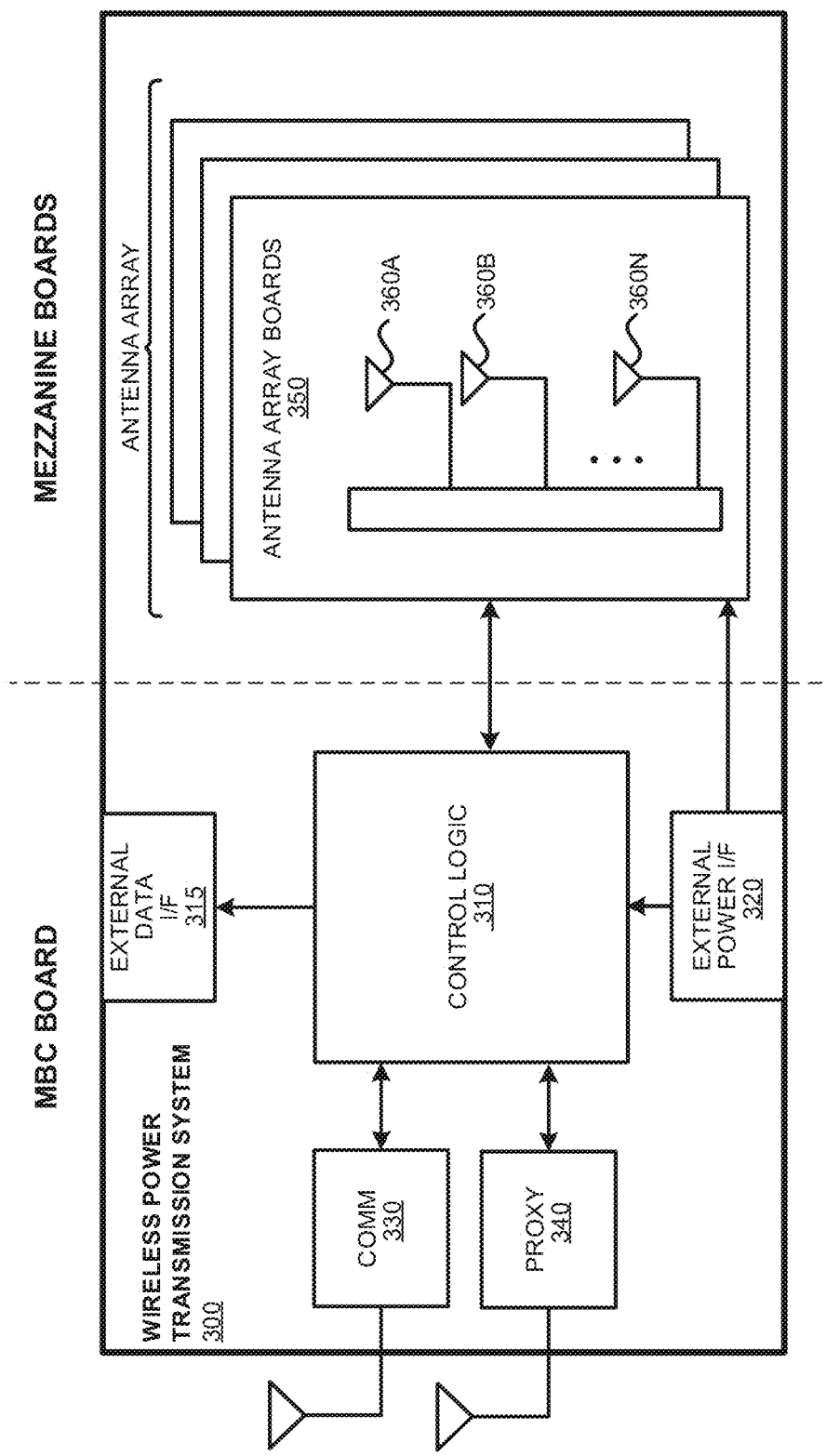
FIG. 3 depicts a block diagram illustrating example components of a wireless power transmission system in accordance with some embodiments.

FIG. 3 depicts a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™, Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™, ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the master bus controller (MBC), which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
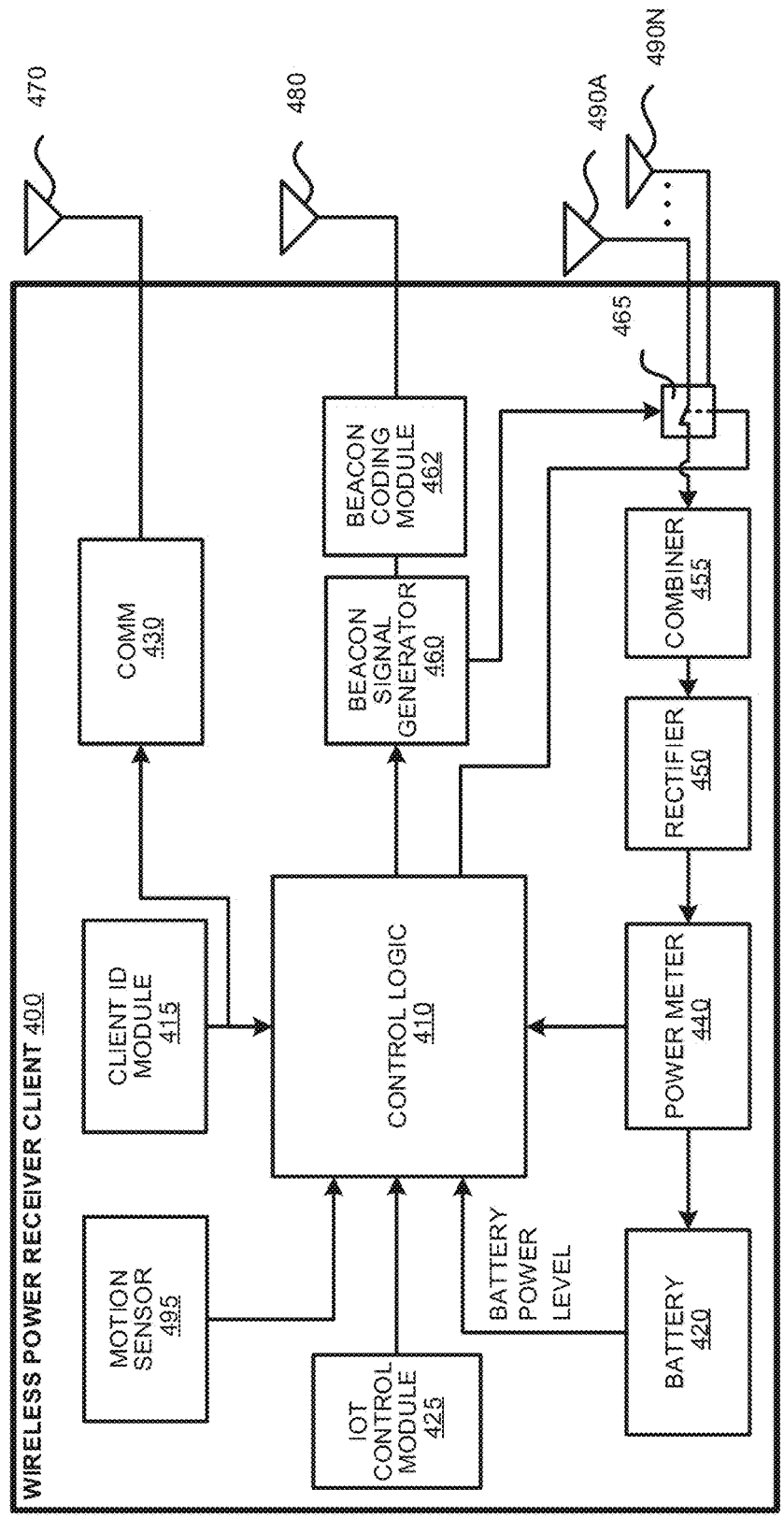
FIG. 4 depicts a block diagram illustrating example components of a wireless power receiver client in accordance with some embodiments.

FIG. 4 is a block diagram illustrating example components of a wireless power receiver client 400, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client 400 does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 receives and processes the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the wireless power receiver client 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client 400 is embedded, usage information of the device in which the wireless power receiver client 400 is embedded, power levels of the battery or batteries of the device in which the wireless power receiver client 400 is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the wireless power receiver client 400 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
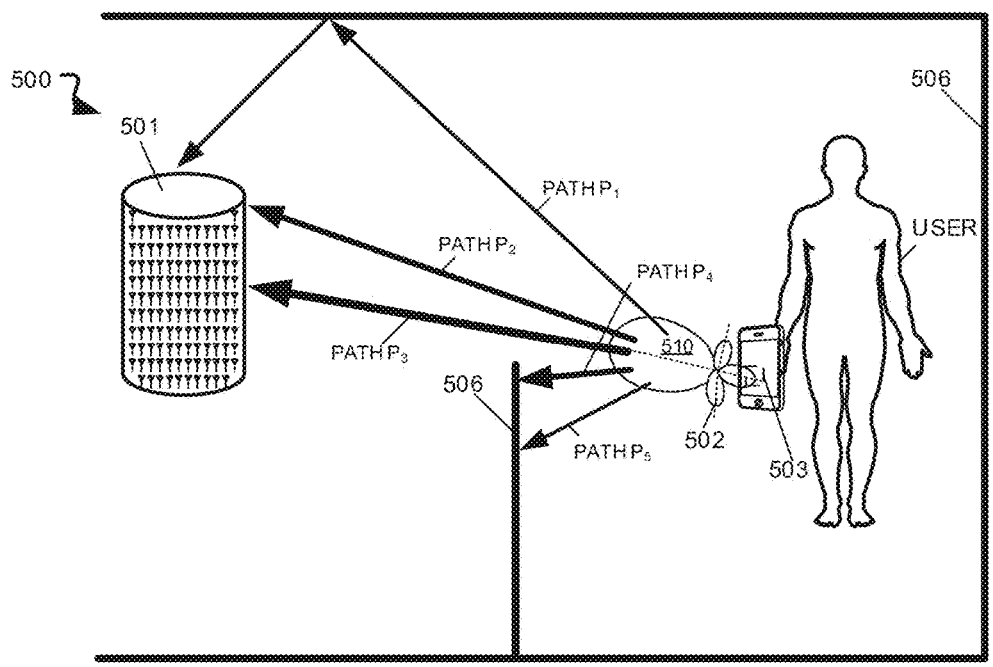
FIGS. 5A and 5B depict diagrams illustrating an example multipath wireless power delivery environment in accordance with some embodiments.
Figure 5B:
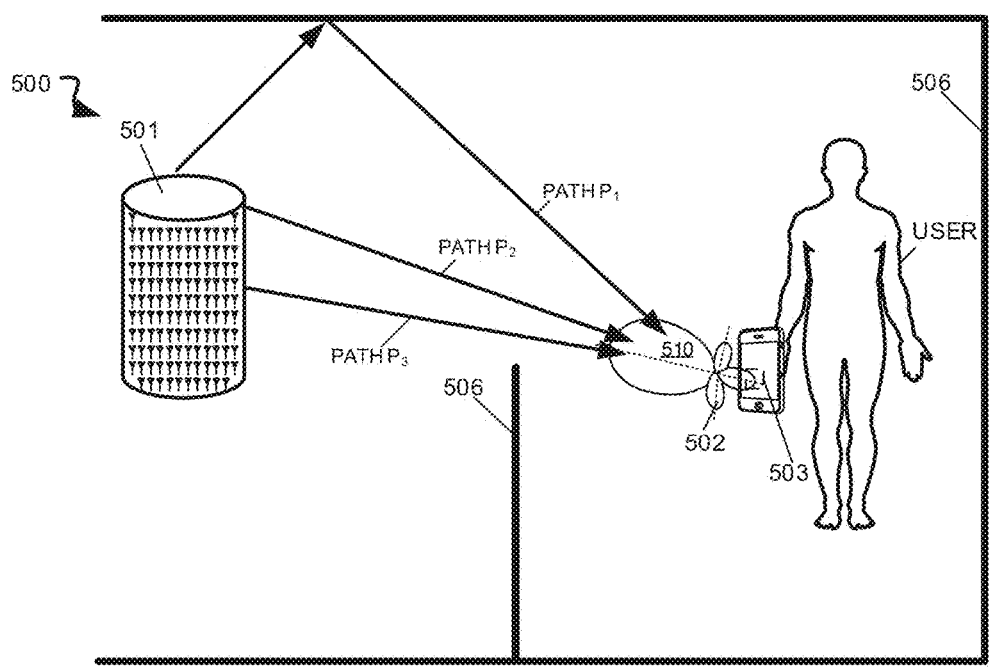

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., received signal strength indication (RSSI), depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receiver, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

II. Techniques for Device Authentication

In order to increase wireless power transmission efficiency, a number of techniques may be employed such as, for example, multipath power transmission, efficient power delivery scheduling, and providing power to select devices. In order to effectuate many of these efficiency measures, the devices being powered must be known to the system and preferably authorized for receipt of the power transmission.

Techniques are described for authenticating devices in wireless power delivery environments. Among other benefits, the authentication techniques described herein enable device tracking, gathering of analytic information concerning devices and user behaviors, improved wireless power scheduling, and targeted or prioritized device charging in closed charging environments. In some embodiments, the authentication techniques described herein facilitate granular control over which devices are allowed to be added to a power schedule based on an authentication status of the device. Additionally, in some embodiments, the techniques described herein also facilitate enhanced environmental control in wireless power delivery environments.

Initially, a request for wireless power (or energy delivery) is received by a wireless power transmission system from each of one or more devices (or wireless power receiver clients) in a wireless power delivery environment. The request can include an identifier such as, for example, a wireless power receiver client identification (client ID). The wireless power transmission system responsively queries a remote authentication platform with the client ID. The authentication platform compares the client ID against devices or (wireless power receiver clients) that have been registered with the system or service. If the device is properly provisioned, the authentication platform provides the wireless power transmission system with an indication of acceptance or approval of the authentication to the wireless power transmission system. Alternatively or additionally, in some embodiments, the wireless power transmission may maintain a local listing of approved devices which may be periodically updated and/or otherwise synchronized by the authentication platform.

When an approval is provided to the wireless power transmission system, the approval may identify an authentication period. The authentication period may include, for example, start and end times of the authentication period, a start time and duration of the authentication period, or combinations or variations thereof. As discussed herein, during the authentication period, the device (or wireless power receiver client) can be added to a power cycle or power schedule. During the power schedule, the wireless power transmission system transmits wireless power (or energy) to each of the various devices (or wireless power receivers) included in the power schedule as discussed herein. Once the authentication period elapses, the device (or wireless power receiver) needs to be re-authenticated in order to be included in subsequent power cycles.

Initially, a device (or wireless power receiver client) must be provisioned to be included in the listing of accepted devices. The provisioning process may include registering the device (or wireless power receiver client) via an administrative browser based application and/or native application. For example, the client ID, among other possible device information, may be registered and stored as part of this process.

In some embodiments, when a device enters a network where authentication is needed, the wireless power transmission system may push a notification to the device. The notification allows a user of the device to accept the terms and conditions and be included within the authenticated device listing. Information regarding the user, device or both may also be required in order to register. For example, the user may be asked to provide a code or other information in order to be authenticated. In some embodiments, the registration process may also allow the user to configure privacy settings.

Among other benefits, the authentication process allows device usage and other information to be collected across various wireless power delivery environments over geographically diverse networks. The usage information may be employed to enhance the power delivery experience for the user and provide retailers, businesses, etc., valuable information regarding their customer base.

In addition to device authentication, the techniques described herein further describe the ability to control an environment within a wireless network. Environmental control leverages the phenomena that movement within a wireless network can alter signal amplitude, phase and polarity. Specific movements may result in repeatable patterns of signal modulation. When such patterns are detected, it may be leveraged to trigger an action by a device. For example, a gesture in front of a door may enable the unlocking of the door lock. Another gesture may be utilized to modify the thermostat temperature or to power cycle an appliance within the home.

The techniques discussed herein further discuss the ability to perform various system diagnostics by monitoring the network environment. Periodic or sustained changes in signal amplitude or phase may indicate jamming or theft of power by an unauthorized device. Likewise, loss of connectivity with an expected device for a period of time, e.g., a period longer than the life of the device's battery may indicate an issue with the device or with the power transmission. In such instances, an administrator may be notified or otherwise alerted when such an error occurs.

Figure 6:
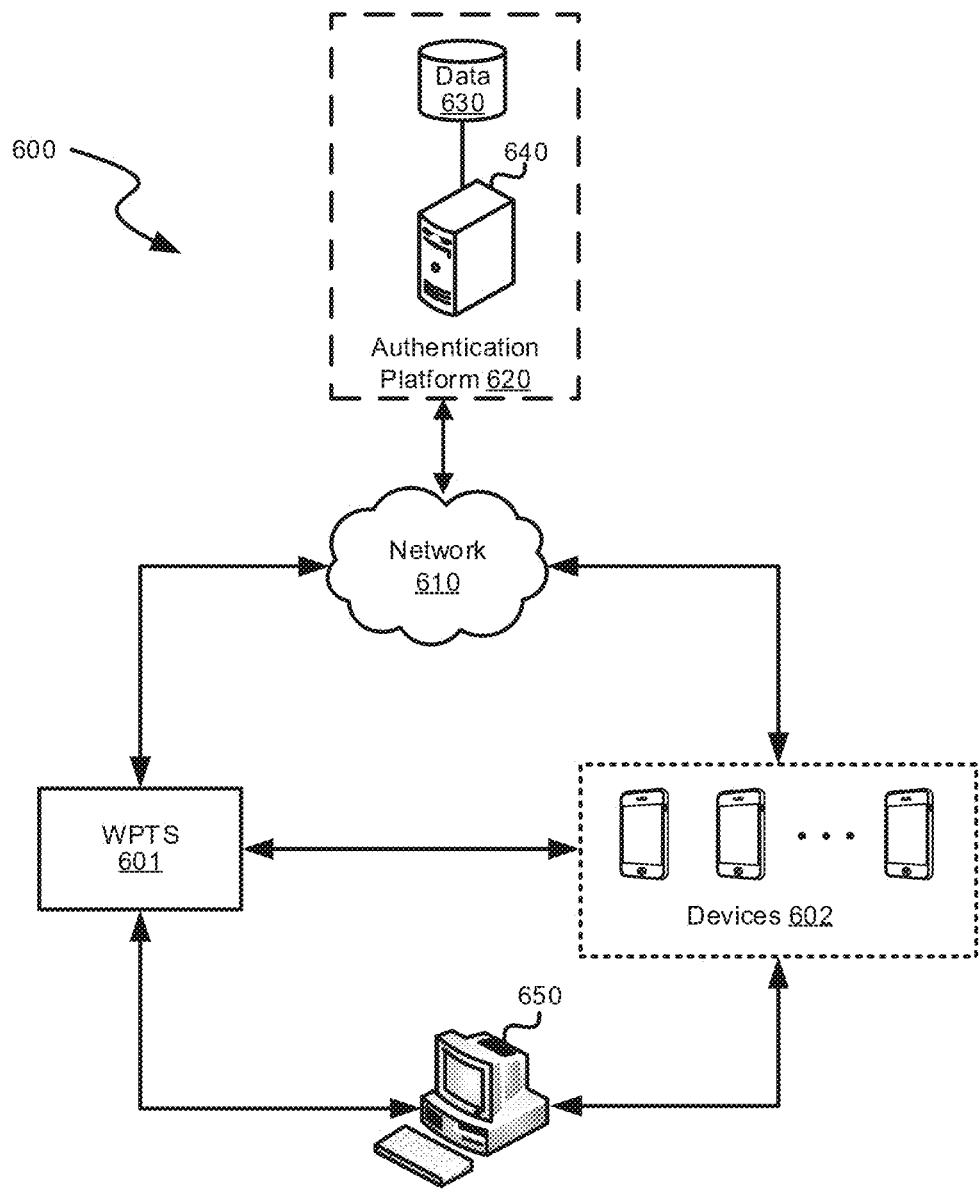
FIG. 6 depicts a block diagram illustrating an example environment for facilitating device authentication in a wireless power delivery environment, according to some embodiments.

FIG. 6 depicts a block diagram illustrating an example environment 600 for facilitating device authentication in a wireless power delivery environment, according to some embodiments. The example environment 600 includes an authentication platform 620 in communication with a network 610. Also coupled to the network 610 is a wireless power transmission system 601 and one or more devices 602. As shown in the example of FIG. 6A, the wireless power transmission system 601 and the devices 102 also couple to a local administrative system 650. The wireless power transmission system 601 can be wireless power transmission system 101 FIG. 1 or wireless power transmission system 300 of FIG. 3, although alternative configurations are possible. Likewise, the wireless devices 602 can be wireless device 102 of FIG. 1 including one or more wireless power receiver clients (not shown). The wireless power receiver clients can be wireless power receiver client 103 of FIG. 1 or wireless power receiver client 400 of FIG. 4, respectively, although alternative configurations are possible. A single wireless power transmission system is illustrated for simplicity. It is appreciated that the example environment 600 can include any number of wireless power transmission systems. Additional or fewer components are possible.

The network 610 may be any type of cellular, wired Ethernet, Wi-Fi network, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The network 610 can be any collection of distinct networks operating wholly or partially in conjunction to provide connectivity to the authentication platform 620, wireless power transmission system 601 and devices 602, in some cases where the devices are capable of independent communication with the network 610. In some embodiments, communications to and from the authentication platform 620, wireless power transmission system 601 and devices 602 can be achieved by, an open network, such as the Internet, or a private network, such as an intranet and/or the extranet, or a combination or variation thereof.

The authentication platform 620, wireless power transmission system 601 and devices 602 can be coupled to the network 610 (e.g., Internet) via a dial-up connection, a digital subscriber loop (DSL, ADSL), cable modem, wireless connections, direct fiber connections and/or any other types of connection. To perform the authentication discussed herein, the wireless power transmission system 601 may be in communication with the authentication platform 620. In addition to the authentication functionality, such a connection may also allow for usage data to be compiled, and updates to be provided to the charger. The connection between the authentication platform 620 and the charger may be a real-time live connection, or the authentication platform 620 could alternatively periodically share the 'approved' listing with the wireless power transmission system 601, and the wireless power transmission system may reconcile the 'local copy' of this approved listing against the information provided by the authentication platform 620. As shown, the authentication platform 620 includes one or more servers 640 and data repositories 630. The authentication platform 620 may comprise any number of servers 640 and/or data repositories 630. The databases 630 can be implemented via object-oriented technology and/or via text files, and can be managed by any database management system.

In operation, a specific device of devices 602 sends device specific information to the administrative interface 650. This information can include a radio ID, in situations where power is transferred via RF transmissions. Alternatively, or additionally, the information provided may include a device or client ID or model number, and other settings for the device. The administrative interface may subsequently provide this information to the charger 101.

Information may be manually entered to the administrative interface 650 by a human, or may be auto-populated by scanning the device, or otherwise synching the device to the administrative interface 650. In some embodiments, the administrative interface 650 is a web portal or locally hosted application presented on a computer device within the wireless charging environment. Devices may be plugged into the computer hosting the administrative interface 650 for collection of device information (such as battery type, model number, usage patterns, etc.), in some embodiments. The device settings may additionally, or alternatively, be directly uploaded to the authentication platform 620 where the device has network connectivity.

After initial device settings have been collected, the device 602 provides an ID, typically a radio ID associated with its beaconing signal, to the charger 601. The beacon signal indicates to the charger 601 that power is desired, and also provides a mechanism to synchronize power delivery.

In some embodiments, the charger subsequently sends the received ID to the authentication platform 620 via the network 610 for comparison against the authentication records stored in the database 630. Only devices that have been registered, either via the administrative interface 650, or directly with the authentication platform 620, are determined to be authenticated devices. In this case the authentication platform 620 returns to the server a positive authentication message that includes the client ID, device ID (where the radio and device are separate), provider ID and a start and end time for the authentication. This start and end time determines when the device requires a re-authentication in order to continue receiving power.

The charger 601 utilizes this information to provide a notification to the device on when to expect a wireless power delivery. As previously noted, this power delivery may include the sending of RF signals, but may alternatively rely upon acoustic transmissions, photonic transmissions, microwave transmissions, or any other suitable power transmission.

Authentication of devices in this manner may be utilized to determine power delivery schedules. For example, any given network may be designated as either an "open" connection, where any device 602 may form a connection with a charger 601 in order to receive power, or a "closed" system, where only properly authenticated devices may receive power transfers. Alternatively, there is the possibility of hybrid systems that may preferentially power authenticated devices, possibly on a tiered basis, and yet still provide power to any requesting device albeit with a lower priority, known as a "semi-closed" system.

Figure 7:
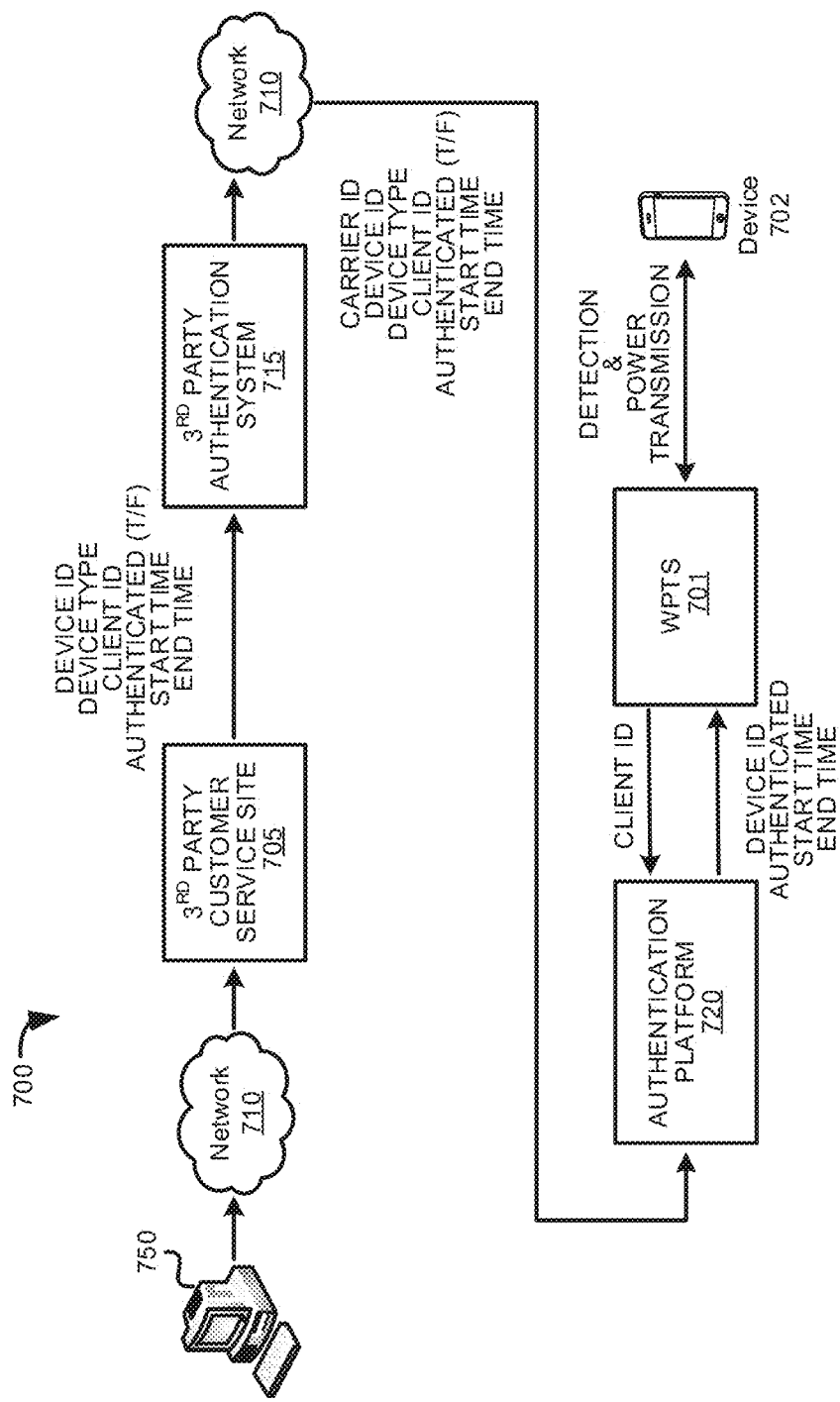
FIG. 7 depicts a diagram illustrating an alternate embodiment of a wireless network where authentication of devices is performed, according to some embodiments.

FIG. 7 depicts a diagram illustrating an alternate embodiment of a wireless network 700 where authentication of devices is performed, according to some embodiments. Unlike the example of FIG. 6, this system leverages third party systems in order to authenticate wireless power receiver clients embedded and/or otherwise included in a device 702, e.g., with embedded or ass. In particular, the user uses a workstation 750 to upload device information by logging into a third party website 705 and entering in the client ID. The workstation may connect to the third party site though the network 710. The third party website 705 then provides a device ID, device type, client ID, authentication status (either true or false) and start and end times for the authentication to a third party authentication system 715. The device ID and authentication status may be derived from the user's input, or collected from some external database.

In some embodiments, the third party is a telecommunication operator. In such situations the device may include a mobile phone which is associated with a carrier. The third party authentication platform 715 may provide the carrier ID, device ID, device type, client ID, authentication status (either true or false) and start and end times for the authentication to the authentication platform 720. Then, when the user enters a wireless network, the charger 701 is able to detect the client device 702. The charger 701 then checks if the device is authenticated, and for how long, using locally stored authentication data. If there is no local data regarding the device 701, the charger may supply the client ID to the authentication platform 720 for reference against their database. The authentication platform 720 provides back if the device is authenticated, as well as a device ID and start and end times. The charger 701 then is able to supply power to the device 702 for the duration of the authentication period. After which the charger must re-authenticate the device.

The wireless device 702, which can include one or more wireless power receiver clients, can be wireless device 102 of FIG. 1 and wireless power receiver client 103 of FIG. 1 or wireless power receiver client 400 of FIG. 4, respectively, although alternative configurations are possible. Likewise, wireless power transmission system 701 can be wireless power transmission system 101 FIG. 1 or wireless power transmission system 300 of FIG. 3, although alternative configurations are possible.

Figure 8A:
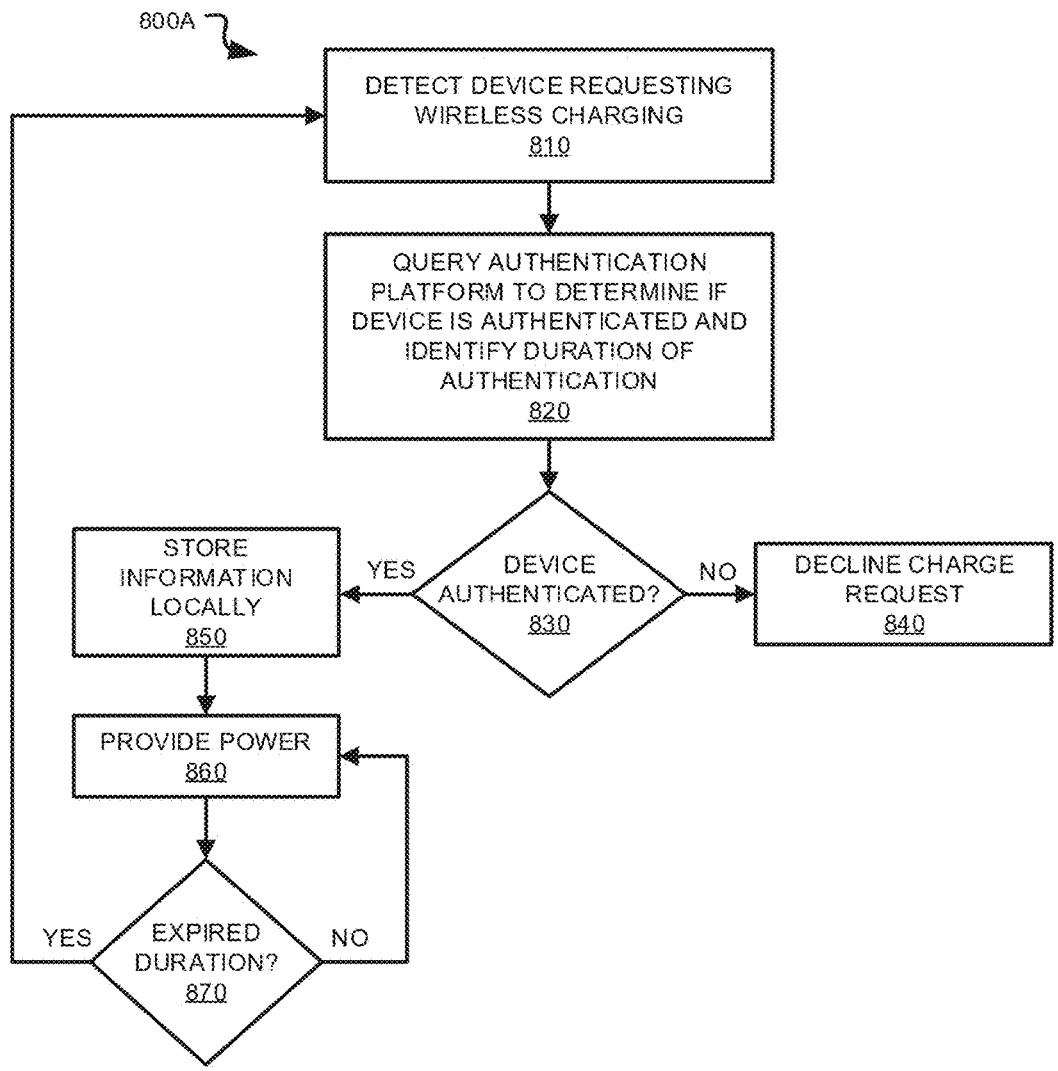
FIGS. 8A and 8B depict flow diagrams illustrating example processes for authenticating a device in a wireless power delivery environment, according to some embodiments.
Figure 8B:
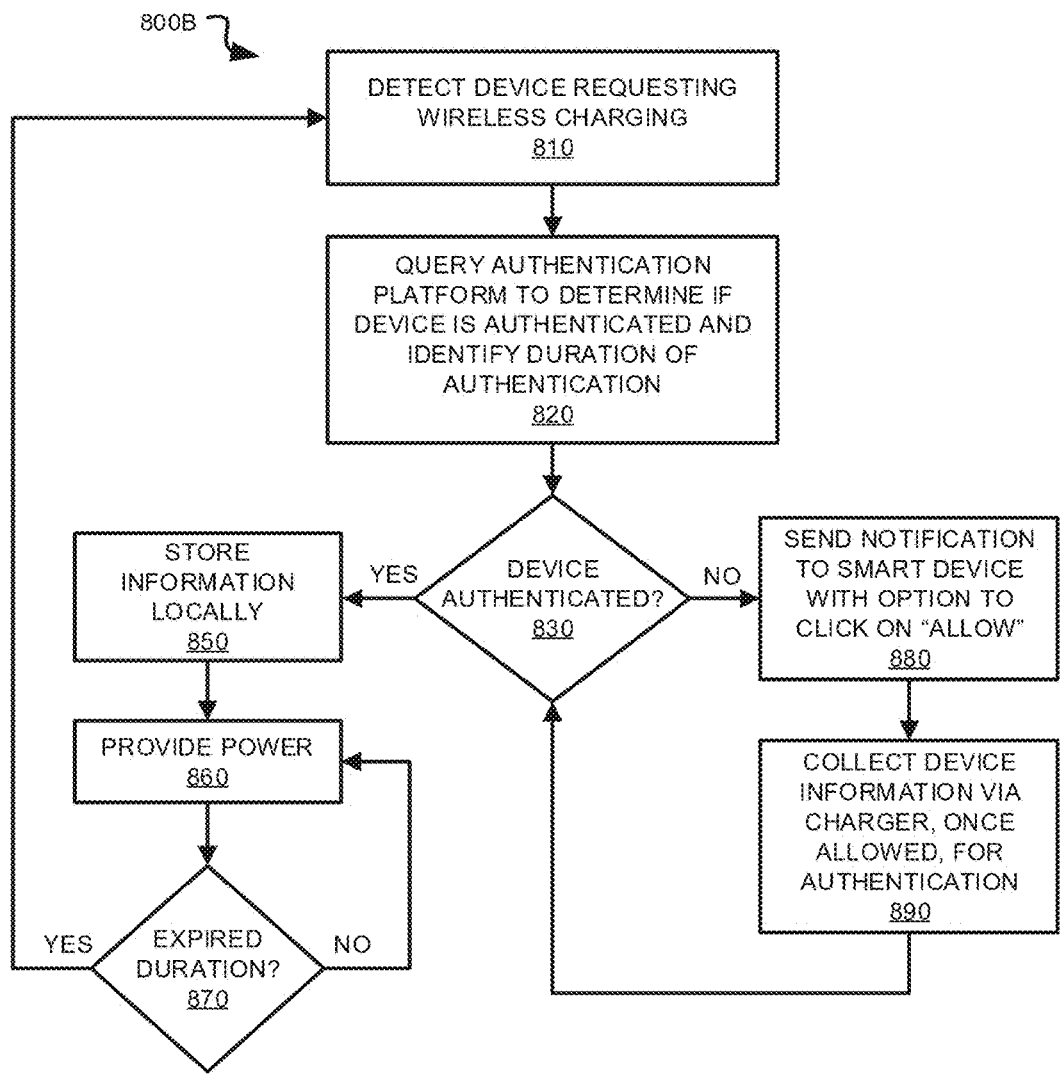

FIGS. 8A and 8B depict flow diagrams illustrating example processes 800A and 800B for authenticating a device in a wireless power delivery environment, according to some embodiments. More specifically, the example process 800A depicts a technique for determining if a device is authenticated via a remote authentication and, if so, providing a wireless charge to that device during an authentication period. Likewise, the example process 800B depicts a similar technique where the user does not have to pre-provision the device before authentication. A wireless power transmission system such as, for example, wireless power transmission system 101 of FIG. 1 or wireless power transmission system 300 of FIG. 3, can, among other functions, perform the example process 800.

Initially, a user provisions a device by, for example, logging into an administrative website or other administrative application and providing device information, e.g., the device ID. As discussed herein, additional information may also be provided by the user, e.g., power usage, charging configurations, etc. In some embodiments, the administrative website or other administrative application may be hosted on a local administrative interface (typically a local computer system) that is capable of connecting to and communicating with the authentication platform via the internet or other suitable network. The application may be downloaded from an online marketplace or public application store such as, for example, the Apple App Store™, Google Play Store™, etc. An equivalent application may also be downloaded from a manufacturer's App Store for the charger device in order to ensure security and reliability of the system.

The provisioning of the device may be associated with a specific user. In some embodiments, the authentication information may be directly posted on the authentication platform cloud or may, alternatively, be initially processed by a third party (e.g., KDDI portal) before being uploaded to the authentication platform. The system admin interface (UI) can make a distinction between devices that are active (i.e., charging) and those that are inactive (i.e., not charging) through, for example, the display of a charge symbol. A customer service system provides the device ID, device type, receiver ID (if independent from the device), authentication status, and authentication start and end times to the authentication server. This information may be stored by device manufacturer for lookup by the customer service system or may be provided by the user upon device provisioning. The provisioning of the wireless power transmission system the first time will benefit from QR Code scanning provided in the native application. The QR Code may be printed on paper inside the Client Device box or on the device itself. The authentication network will support both Charging and Data Access to the Wi-Fi hub as a default mode. The administrator can choose to separate those for certain scenarios. As discussed herein, in some embodiments, the wireless power transmission system includes a Wi-Fi hub. In these embodiments, the user does not have to be provisioned twice, one for power and one for data, and instead may leverage the single provisioning for both data and charging.

Once provisioned, the wireless power transmission system subsequently detects that a request for wireless power transmitted by a device within a wireless power delivery environment (810). As discussed herein, the wireless power delivery environment can comprise a location, area, or region that is served by one or more wireless power transmissions systems. The request for charging can include an identifier, e.g., the receiver/radio ID, for identification purposes. Alternatively, the identifier or other credentials may be provided with a beacon for identification purposes. In some embodiments, the system administration can display devices that are detected but not yet authorized, as well as authorized devices.

The wireless power transmission system then queries a remote authentication platform to determine whether the device is authenticated and thereby eligible to receive wireless power (820). As discussed herein, the query can include the identifier, e.g., the receiver/radio ID. At decision step (830), the wireless power transmission system receives a response from the remote authentication platform and determines whether the device is authenticated using the response.

If the device is not authenticated, then the request for wireless power received from the device can be ignored or declined (840). In some embodiments, e.g., where the charging system is set up as semi-closed, non-authenticated devices may still be provided power, but at a lesser rate or priority than authenticated devices. For example, in such a semi-closed system, only after all authenticated devices are sufficiently charged will non-authenticated devices be provided power. In other embodiments, all devices are provided power, but the acceptable charger threshold for non-authenticated devices may be set lower than authenticated devices. In yet another embodiment, non-authenticated devices are only provided charge if no authenticated devices are present.

Returning to FIG. 8A, if the device is authenticated by the authentication platform, then the authentication platform provides the device ID, authentication duration, e.g., start time and authentication end time, to the wireless power transmission system. This information is then stored locally at the charger or at a local database (850). In addition to authentication duration and device ID, other information such as power delivery scheduling information, device power consumption, or other configuration data may likewise be provided. Such data may enable more effective power scheduling by the wireless power transmission system, especially when many devices are present, and total deliverable charge must be partitioned out equitably. The calculation of power schedule delivery and balancing may be done either in the wireless power transmission system or in the cloud.

The wireless power transmission system then provides charge to authenticated devices in accordance with a power schedule (860). Power schedules may include 'round-robin' style power delivery or may include more advanced scheduling that takes into account device types, power usage rates, available power levels at the device ("time-to-death/hibernation" for the battery), user priority, effectiveness of power transfers, etc. During the powering of the devices, the wireless power transmission system checks that the authentication duration has not been exceeded. For example, the end time can be monitored, a duration timer, etc. Once the authentication duration expires (870), the wireless power transmission system returns to an earlier stage where power is no longer being delivered to the device. If the device still requires a charge, it may request it and the authentication process may be repeated to determine authentication of the device. In this way the authentication for any given device naturally sunsets, ensuring that the list of authenticated devices locally stored are never overly stale.

Referring next to FIG. 8B, in the example process 800B the user does not have to pre-provision the device before authentication. More specifically, if the device is not authenticated (830), then rather than being ignored by the wireless power transmission system, the wireless power transmission system may send a notification to the device (880) with an option to allow for charging. This may include routing the device to a webpage, for example, that directly interfaces with the authentication platform. The user may be required to register their device, accept terms and conditions, and even enable contact with third party systems. For example, a customer's receipt may include an alphanumeric code that is entered in order to allow the customer to register their device. In such instances, only customers gain the benefit of wireless charging. It can be easily imagined that alternate verification schemas could also be employed. For example, a scan-able bar or QR code could be printed on the receipt. Consequently, rather than requiring the user to type in the code, it may instead be simply photographed by the device via the application/webpage the charger directed the device to.

In some embodiments, rather than affixing an access code to the receipt, it is possible that individual products may instead have the code on them. Returning to our coffee shop example, each cup may include a QR code printed on its side. Upon ordering the cashier could scan the code with the cash register scanner which then connects to the authentication platform and authorizes that code for use. Then when the user attempts to charge, the device is redirected to the authentication application or web portal, and the device is used to snap a photo of the QR code. This code is compared to recently authorized codes, thereby ensuring that the user is an authentic customer and eligible for charging.

Such a system also allows for tracking of user's behaviors across different locations. For example, in our coffee shop example, it may be that this shop is one of a national chain of coffee shops. The user may frequent many establishments based solely upon her current location. It may be assumed that any given device belongs to a single user (or household). Thus, if a specific device is detected at multiple locations over time and the ordering habits of the device's user is likewise coupled to the device's authentication, a map of purchasing and location information may be generated over time. Such analytics may be utilized for modeling consumer behaviors and may be a value added service to the retailer.

Such tracking implies certain privacy issues. In order to address these issues, upon routing to the authentication application/web portal, the user may be requested to accept terms and conditions for their usage of the wireless charging service. At a minimum this agreement may be a limitation of liability for the retailer, but may extend to allowing the user to set privacy settings for their device. For example, a more privacy minded individual may wish to not have their activity tracked. The system allows for the local charger to operate with a device ID, start time and end time. Likewise, upon expiration of the authorization records in the authentication platform may be purged. This would allow a given user to maintain a very high degree of animosity and privacy. Alternatively, the receiver device could be enabled to supply a single use supplemented unique code that only the authentication platform is capable of decoding. Thus the authentication platform could verify the receiver device, but local chargers would not be able to track the activity of any given device.

In contrast, another user may wish to volunteer device information and allow for location tracking. While this compromises privacy to some extent, such a user could benefit from more efficient power scheduling (due to better understanding of the device type and powering needs), and may even allow for the customization of promotional offers or relative advertisements based upon the user's activity patterns. Additionally, location tracking could further be used to protect the user's identity and prevent theft of data or money. For example, a device detected in Japan, while the user's credit card is being used in India could generate a warning that shuts down the ability for the transaction, or access on the device, until the user can be reached and confirmation that no nefarious activity is happening. Such identify protection capabilities requires the authentication platform to connect with, or otherwise share user location information with other third party systems (such as a banking institution). The key is that the disclosed system is flexible enough to meet any of these goals, customized to even an individual device level to ensure maximum value for the retailer, and desired service and privacy for the user.

Once the device registers with the authentication platform it is then eligible for energy delivery by the charger. In alternate embodiments, rather that the device being routed to a web portal that interfaces with the authentication platform directly, it may also be possible for the charger to initiate all communication with the authentication platform. In such systems, rather than being redirected, a local notification may be sent to the device from the charger (880) where selecting the ability to "allow" charging enables the charger to collect basic information from the device. Typically, this information merely includes the device ID. The charger may then provide the device information directly with the authentication platform (890). Alternatively, a smart charger may rather perform a local authentication where the ID and time is used to generate a locally stored authentication record, including an authentication duration. This eliminates bandwidth overhead with the authentication platform, but also limits the ability for more sophisticated data collection.

FIG. 9 depicts an example screenshot illustrating an administrative login interface 900 for an authentication system, in accordance with some embodiments. This login system may employ a username and password combination. Additionally, the login system may require that the user to provide a user type. For example, login interface 900 illustrates a pull-down menu for the user 'type' entry. Examples of user types may include a home user (owner), business user or service provider user (administrators), and technical support (manufacturer), for example.

The administrative page accessed via this screen allows the user to manage chargers and their properties, maintain records of devices in the system, and provide information on the devices, including configurations of when the devices should start and stop charging, etc. If the wireless charging environment has multiple chargers, the administrative web page also allows the user to designate a 'master charger' in the cluster of chargers, which indicates that scheduling and authentication is directed by and through the designated charger. Alternatively, all chargers in a cluster may independently be allowed to access the authentication platform. The administrative interface also allows the user to view currently connected devices and track usage levels.

FIG. 10 depicts an example screenshot illustrating an administrative device registration interface 1000 for an authentication system, in accordance with some embodiments. A first time user who has not previously set up an account will be redirected to such an interface. Here the user is allowed to select a name, password and provide additional contact information. Additionally, the user may indicate what user type he or she is.

Figure 11:
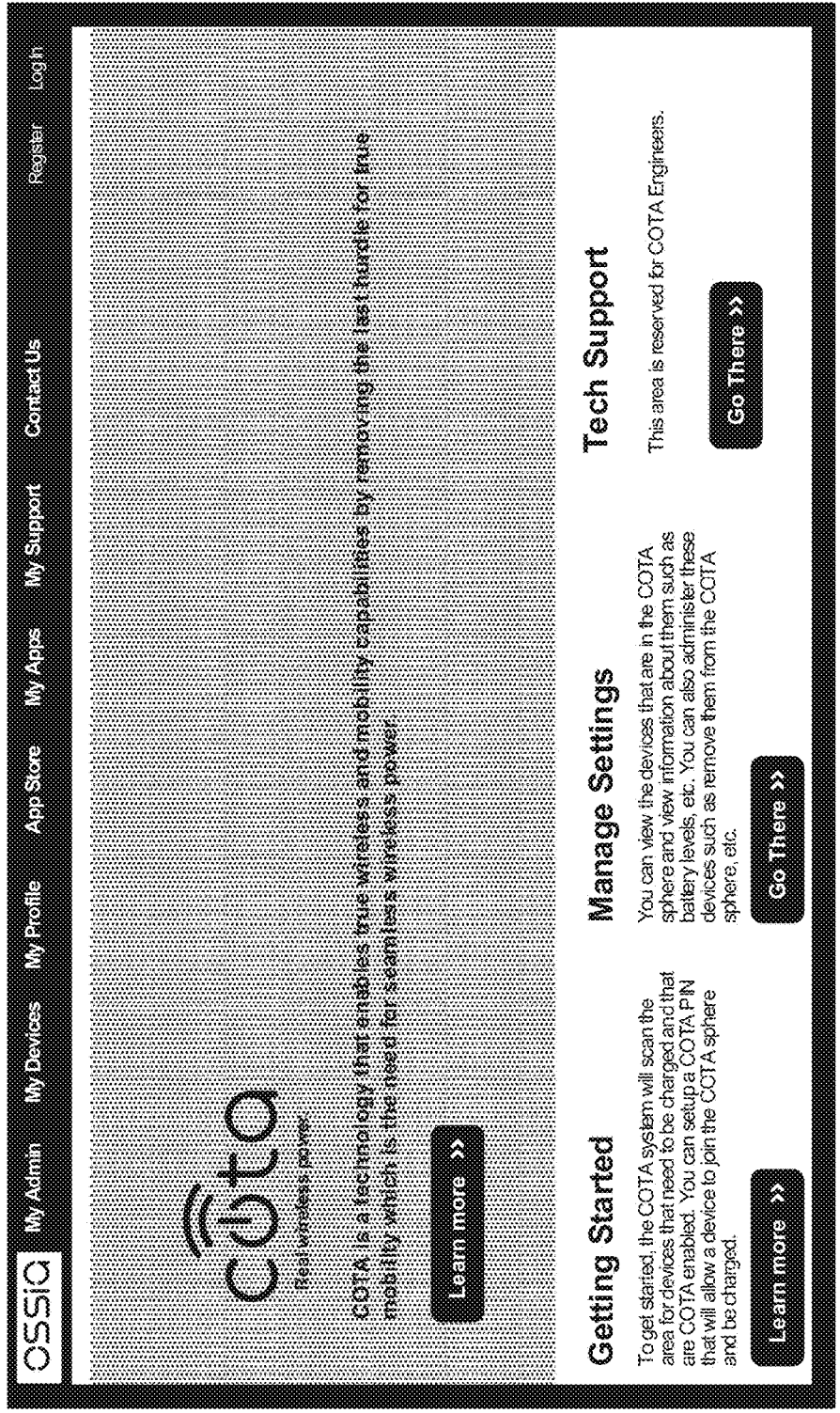
FIG. 11 depicts an example screenshot illustrating a landing page, in accordance with some embodiments.

Upon successful login or registration, the user may be directed to a landing page 1100 as shown in the example of FIG. 11, in accordance with some embodiments. From this homepage the user may be able to navigate to a profile section, a device list, administrative configuration pages for chargers and devices, an app store, and requesting support or contact information with the charger manufacturer. The welcome screen shown may also include easy tutorials in how to utilize the system, as well as walkthroughs for new users.

In some embodiments, the profile section allows the user to change or update their personal information, including contact information. The app store allows the user to search for and download applications that are enabled with the system. For example, applications for generating promotions for customers on your wireless charging network could be downloaded and employed within a retail store. The administration link allows the user to identify chargers within a charger cluster, select if the network is open or closed (or semi-closed and the configuration for charging unauthorized devices, in some embodiments). The charger IP address' powering mode, and cluster type may also be shown and may be edited by the user. The charger mode is whether a given charger is on or off. The cluster mode is either single or multiple clusters. Multiple clusters may be useful for extended business situations. The charger cluster mode may also include a wizard that enables the user to configure the chargers using easily understood graphical representations. Chargers may thus be easily added or deleted from a given cluster utilizing this tool.

Figure 12:
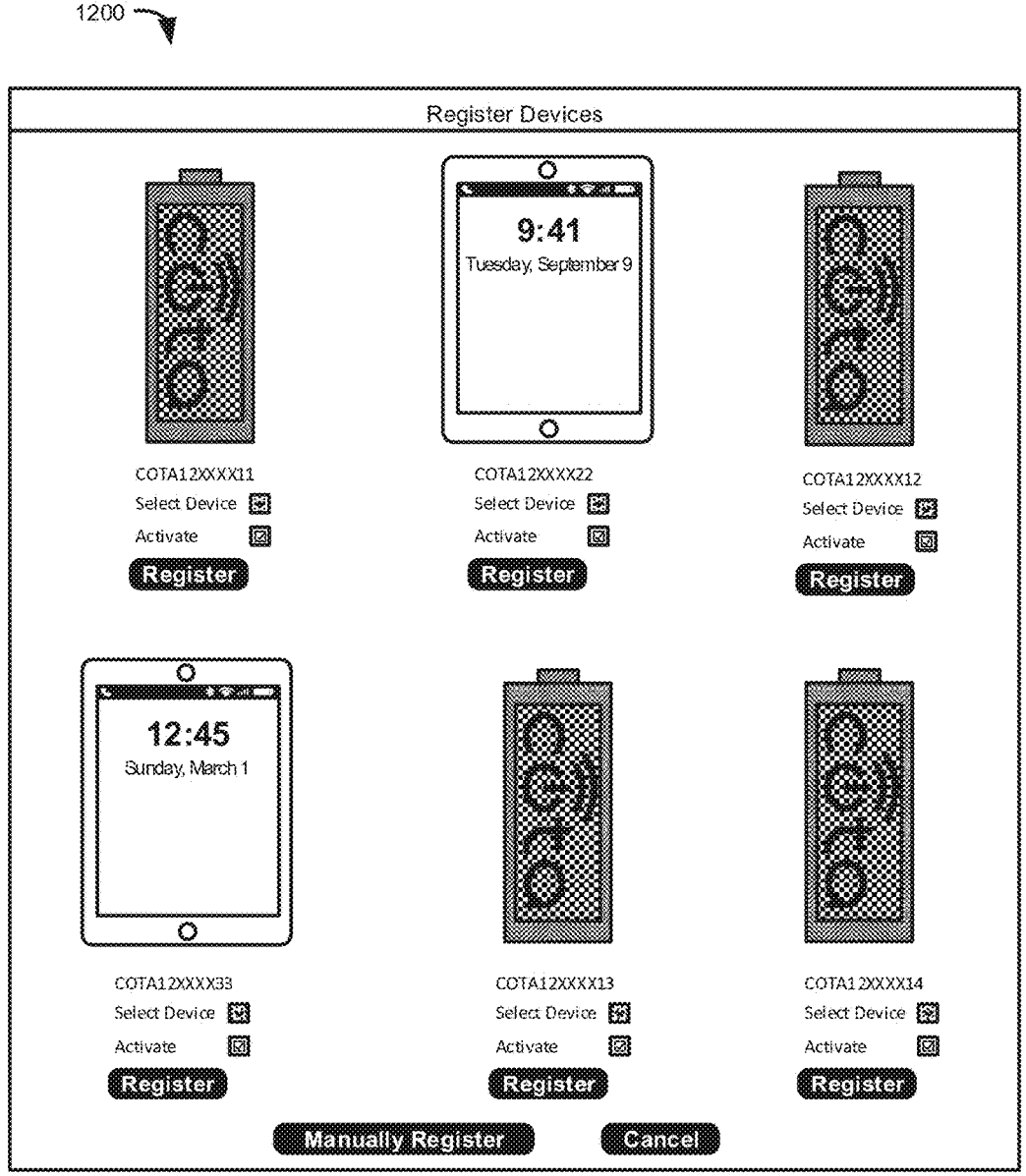
FIG. 12 depicts an example screenshot illustrating an administration page, in accordance with some embodiments.

When the device administration page is selected, the registered device management interface 1200 is presented, as shown in the example of FIG. 12. The registered device management interface 1200 illustrates all devices within the vicinity of a wireless power transmission system or within a wireless power delivery environment. Devices listed may be registered and may be activated or deactivated. This page also enables the user to manually register a device that has not been detected by the system. If any given device is selected, it may lead to device configurations including the radio ID for the device, device ID (if different from the radio ID), device type (whether the device has a user interface, if the device has power, if it is a smart device or not, etc.). Information allowance (privacy settings) may also be configured at his stage.

Figure 13:
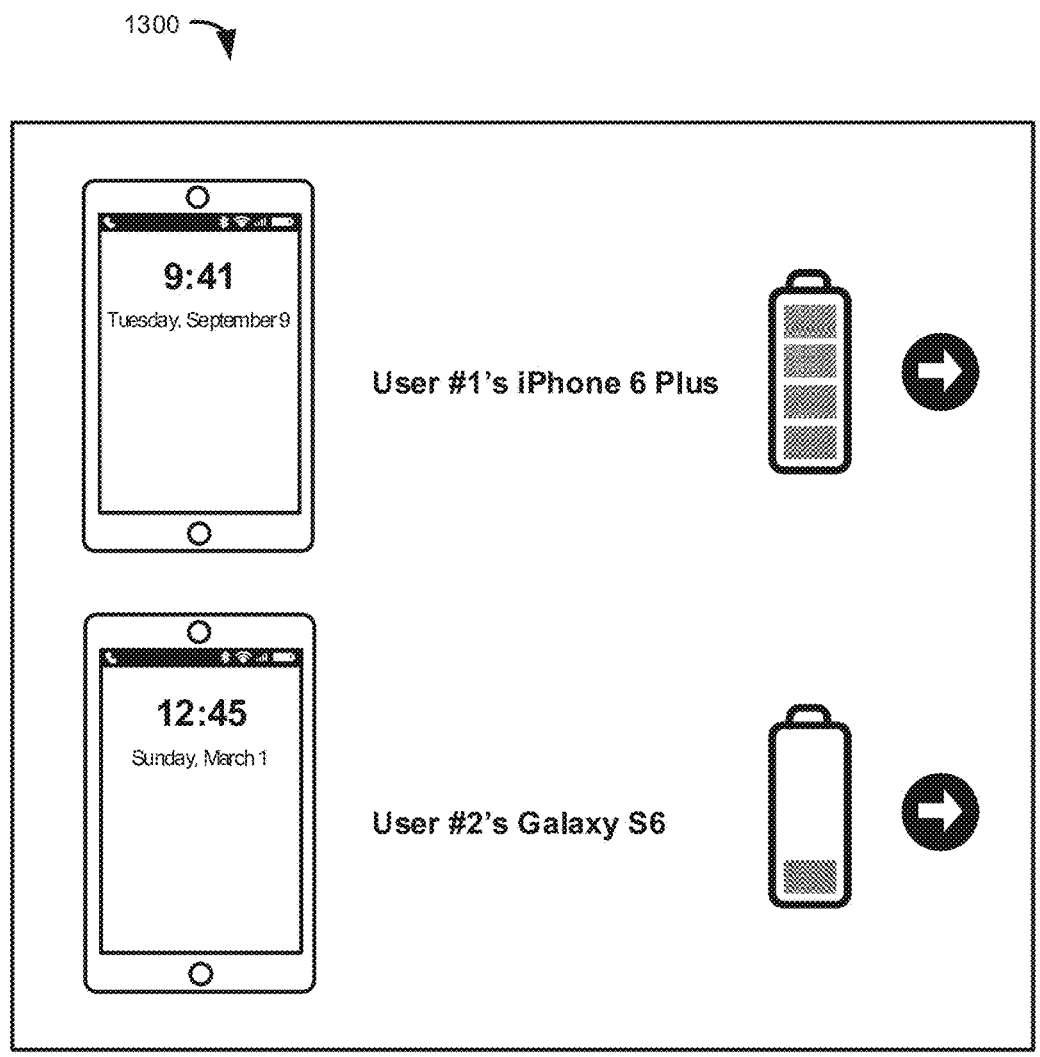
FIG. 13 depicts an example screenshot illustrating devices that are already linked, in accordance with some embodiments.

Devices linked to the charger may be separately populated in a "my devices" page that is accessible from the homepage. FIG. 13 is an example screenshot 1300 of devices that are already linked. The device is shown along with the radio ID, current battery level, and the ability to select any given device for additional details. Such additional details may include, by way of example, usage history, authentication details, power consumption rates, other locations where the device has accessed wireless charge, etc.

The techniques discussed herein also describe physical authentication and environmental control. In some embodiments, a wireless power delivery system may detect movement of objects within a coverage area (or wireless power delivery environment). The system can further identify specific movement patterns and utilize these patterns to control the surrounding environment.

In some embodiments, the system may further determine if there is a fault in power delivery over the system and responsively issue alerts to determine if the system is damaged, suffering from normal interference, or being tampered with. For example, a sustained or periodic change from expected phase, amplitude or polarity could indicate that the signal is being jammed or that some other device is attempting to steal power from authenticated clients. This could generate an alert to a system administrator indicating the problem, trigger authenticated clients to beacon at higher amplitude, trigger authenticated clients to enter a period of sleep (in an attempt to outlive the power thief), and/or shut down the power transmission system until the issue is resolved. In some embodiments, the system may even leverage the shift in phase/amplitude/polarity to indicate an estimated direction (assuming line of sight transmission) of the interfering source in order to assist the administrator in resolving the issue.

Some of these functionalities stem from the fact that the energy being transferred wirelessly travels through the environment as RF signals, acoustic vibrations, photons, etc. These waves travel through the air in virtually every direction. They reflect off of surfaces and arrive at the receiver via multiple pathways. Any obstructions or reflections in the transmission pathways cause shifting of the amplitude, phase, and/or polarity of the waves. Thus, for a perfectly static environment, for a given transmission by a device, the charger should consistently receive a given pattern of received signals. Unfortunately, environments are not entirely static, and temperature variations, air movement, changes in the local magnetic field due to current through wiring, etc. may all cause fluctuations within the environment. However, by observing the environment over time, a natural degree of signal propagation variance will emerge. Major shifts in signal polarity or amplitude outside of these expected variances indicates that something significantly more profound has changed within the environment. In particular movement may be detected. Such movement detection may be utilized for environmental control, security or to trigger alerts.

Figure 14:
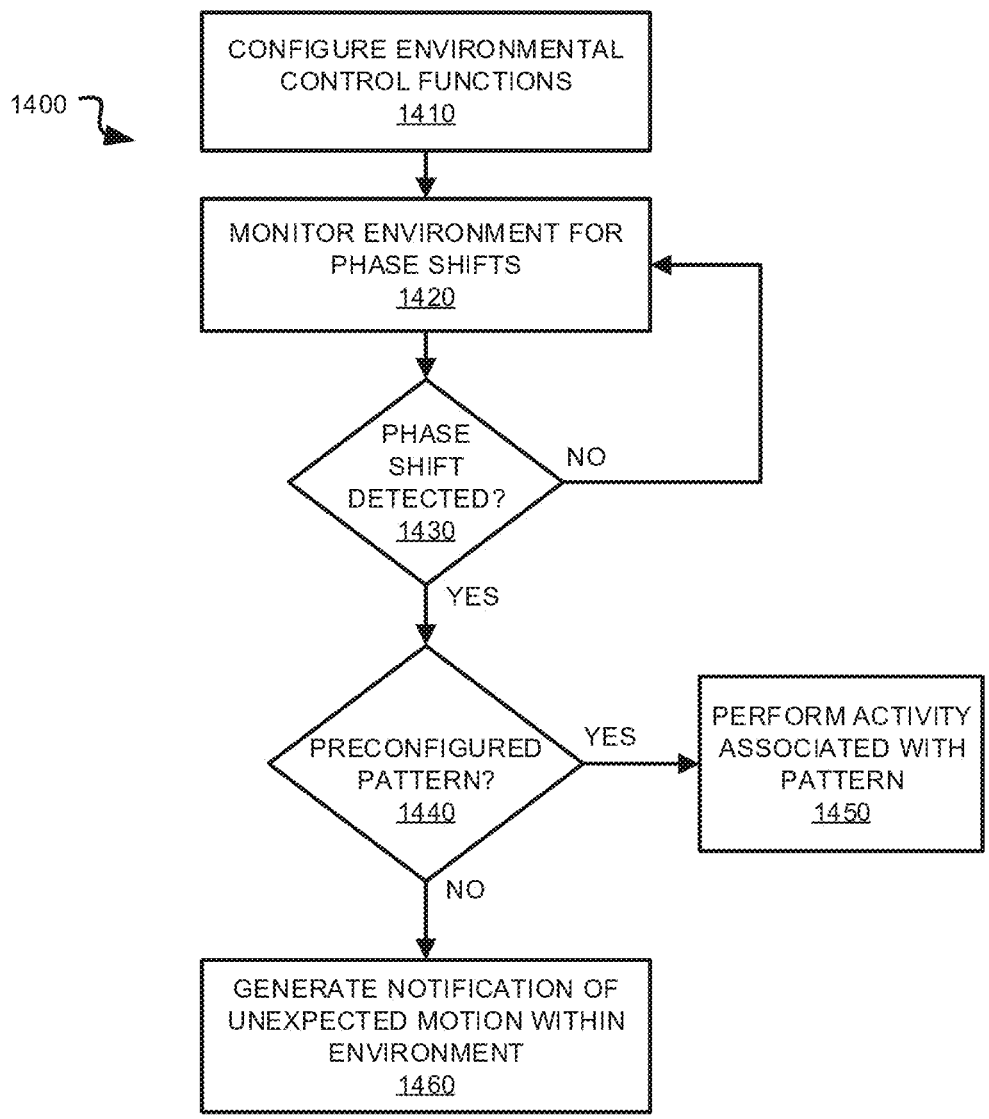
FIG. 14 depicts a flow diagram illustrating example process for performing an environmental control technique in a wireless power delivery environment, in accordance with some embodiments.

FIG. 14 depicts a flow diagram illustrating example process 1400 for performing an environmental control technique in a wireless power delivery environment, in accordance with some embodiments. More specifically, the example process 1400 depicts a technique for performing environmental control using detected phase variances in the wireless power delivery environment. A wireless power transmission system such as, for example, wireless power transmission system 101 of FIG. 1 or wireless power transmission system 300 of FIG. 3, can, among other functions, perform the example process 1400.

To begin, the wireless power transmission system configures environmental control functions (1410) in order to perform an action based upon an input. For example, a business owner may configure the environmental control functions to send a notification of movement within the coverage area during non-business hours (e.g., security focused activity). In contrast, a home user may configure the environmental control functions to perform various functions, e.g., open a smart door lock using a particular hand motion, effectively a physical password for the door.

The wireless power transmission system can then monitor the environment for motion as detected by phase and amplitude shifts from beacon signals. When a phase shift and amplitude change is detected (1430), above the expected shifts caused by background noise, then the system determines if the shifts comport to a designated pattern (1440). If not, then a notification of general motion may be sent to the user (1460) if the system is configured to provide such notifications. However, if the phase and amplitude pattern matches a preconfigured pattern, then the configured activity associated with the pattern may be performed or otherwise triggered (1450). The activity corresponding to a particular motion can comprise any number of activities. For example, the activity can include unlocking a door, turning on an appliance or light, changing the temperature on a thermostat, raising or lowering blinds, or even controlling the volume on a TV or stereo. The system can also include machine learning functionality and/or feedback paths such that the system can identify "legitimate" movement vs. "suspicious" movement based on time of day, physical characteristics, etc. This would make for an intelligent alarm system. Big data techniques can be implemented to identify false positives to minimize action required over non-issues.

Accordingly, given sufficient environmental modeling, and sufficiently granular modeling of the user's motions, any device within the environment where a wireless receiver is embedded can be controlled by basic motions.

In addition to the above disclosed environmental control mechanisms, the currently disclosed systems and methods have the capacity to perform diagnostics on system performance and issue alerts and notifications if an unexpected event occurs. Through the authentication of devices within an environment, information may be gathered from the device. In a home or private environment, some devices may be owned and stationary. A security system motion detector or sensor would be one such device. Even though a specific device may not itself be extremely rudimentary in terms of computational ability, the logic for determining if there is an error with the 'dumb' device may reside in the charger, and thus diagnostics may be performed.

Figure 15:
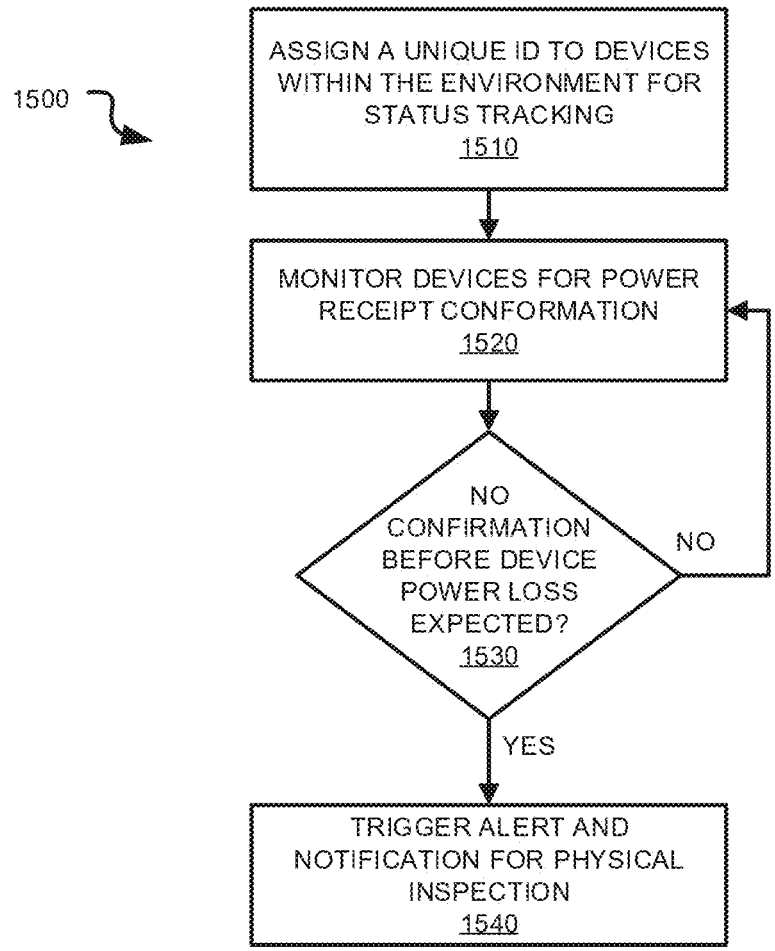
FIG. 15 depicts a flow diagram illustrating example process for providing system diagnostics, in accordance with some embodiments.

Turning to FIG. 15, an example method for providing system diagnostics is provided. Proactive and predictive diagnostics can be performed to forecast system issues based on historical data collected from multitudes of chargers and devices. This example process begins with the authentication of the devices, as disclosed in depth above. In addition to the basic authentication, the charger may locally, or on the authentication platform, assign a unique ID (UID) to each device for performance tracking (1510). In some cases, this UID is the same as the radio ID for the device; in alternate embodiments the UID is newly generated and merely associated with the radio ID. In these cases, the UID may include functional data such as device class, battery life expectancy, and a unique hash to differentiate similar devices.

The charger then monitors the devices for feedback when power has been transmitted (1520). Even very rudimentary devices may have the ability to ping the charger when power has been received. Additionally, more sophisticated devices (a smart thermostat for example), may also be capable of returning information on the actual power amount received. Only the most basic of devices fail to provide feedback of received power; and even in such circumstances the charger may monitor beacon signals for power requests. If a beacon is not received from a device for a duration longer than the battery for that device is expected to last, the charger may infer that the device's battery is dead.

When a determination is made that a device has not been receiving power for its expected battery life is made (1530) by the charger, then the charger may send an alert or notification that there has been an error in the system (1540). Depending upon device type, this notification may be a simple error code, or may be more persistent (i.e., email, text messaging, audible alarm, etc.) especially for devices that have less of a reason to fail (stationary devices for example) or are of higher priority (i.e., smoke alarm, baby monitor, etc.).

The alert or notification may prompt a user to check the device for tampering, damage, or for other causes of power disruption. Typically, interference from an obstacle may be a culprit, as is moving the device out of range of the charger.

Additional Examples

In some embodiments, a method of environmental control within a wireless network is disclosed. The method includes collecting data from transmissions within the wireless charging network, identifying shifts in at least one of phase, polarity, and amplitude of the transmissions corresponding to motion within the wireless charging network; and performing an action in response to the identified motion.

In some embodiments, the method of environmental control further includes configuring a set of actions associated with specific motion patterns.

In some embodiments, the method of environmental control further includes comparing the shifts in phase and amplitude of the transmissions to the configured motion patterns.

In some embodiments, the performed action corresponds to one of the set of actions corresponding to the matching motion pattern. In some embodiments, the action is a notification of movement within the network, an unlocking of a door lock, an altering of a thermostat temperature, a toggling of power of an appliance (on/off), a controlling of other features of an appliance, etc.

In some embodiments, a method of diagnosing a wireless charging network is disclosed. The method includes assigning a unique identifier to at least one device; monitoring the at least one device for wireless power transmissions; and generating an alarm when any of the at least one device fails to receive power for a time longer than an expected battery life for the given device.

In some embodiments, the method of diagnosing the wireless charging network includes assigning the unique identifier to at least one device is part of an authentication process.

In some embodiments, the alarm includes at least one of an error code, a text message, an email, and an audible alarm.

In some embodiments, the method of diagnosing the wireless charging network includes investigating the given device to determine a cause of the power interruption.

Figure 16:
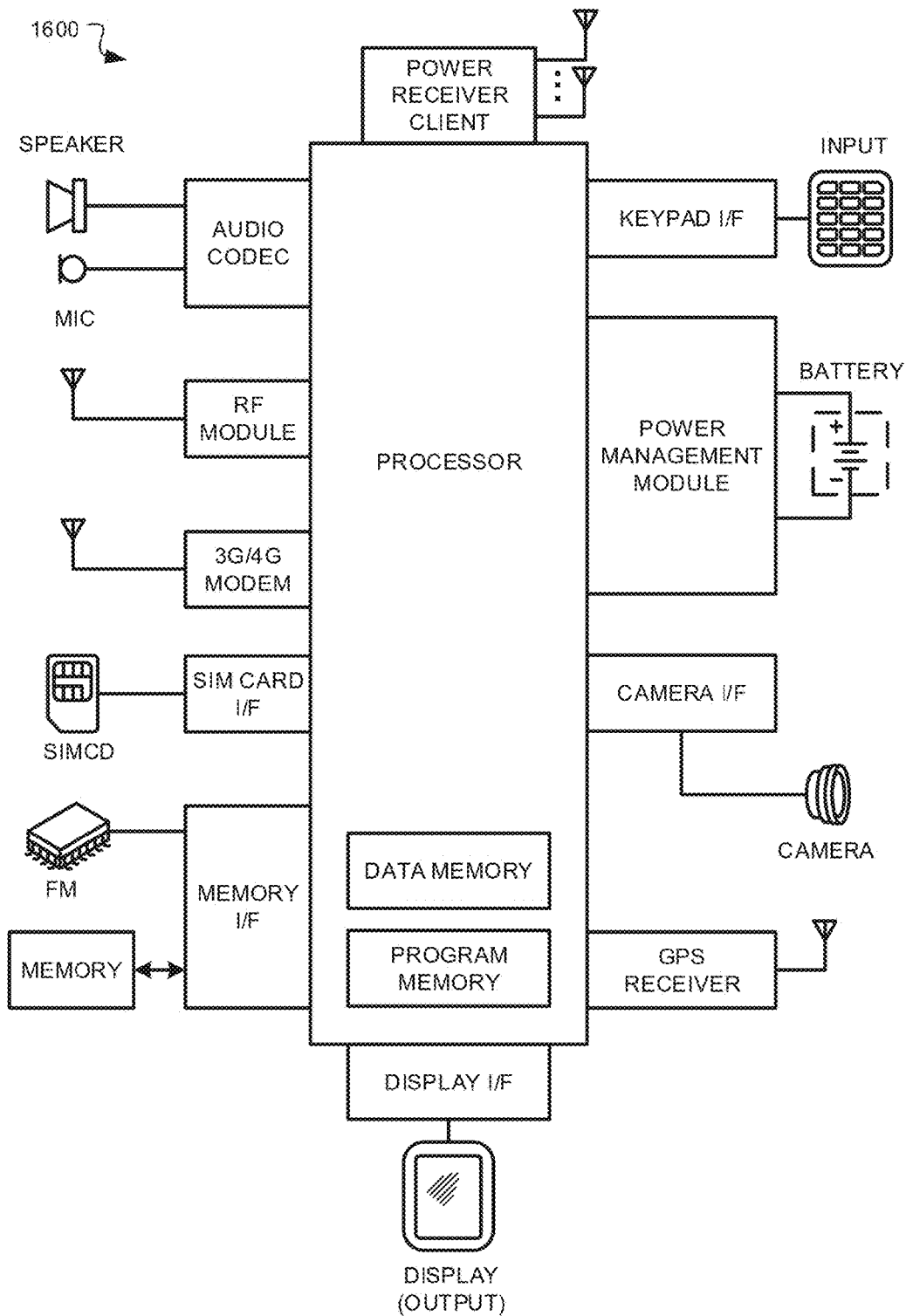
FIG. 16 depicts a block diagram illustrating example components of a representative mobile device or tablet computer with one or more wireless power receiver clients in the form of a mobile (or smart) phone or tablet computer device in accordance with some embodiments.

FIG. 16 depicts a block diagram illustrating example components of a representative mobile device or tablet computer 1600 with a wireless power receiver or client in the form of a mobile (or smart) phone or tablet computer device, according to an embodiment. Various interfaces and modules are shown with reference to FIG. 16, however, the mobile device or tablet computer does not require all of the modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a power transmission system, e.g., wireless power transmission system 101 of FIG. 1.

Figure 17:
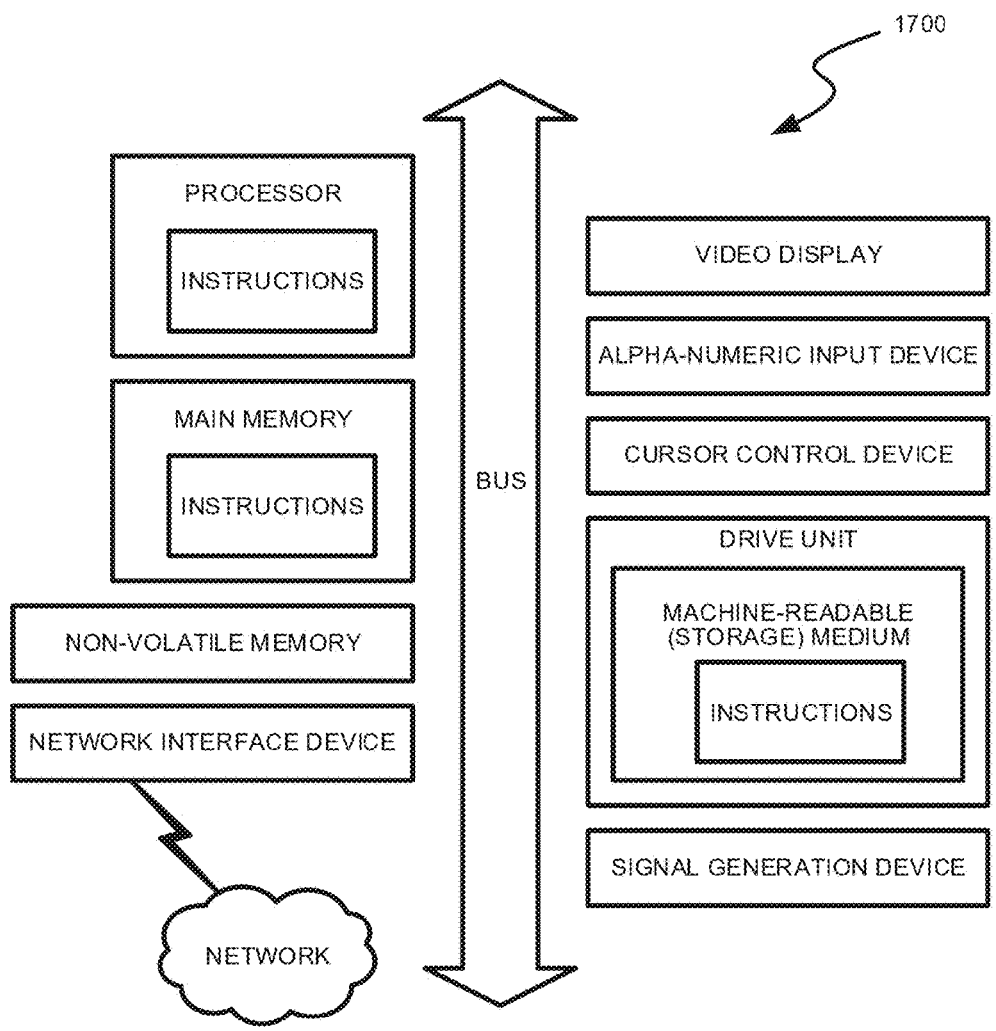
FIG. 17 depicts a diagrammatic representation of a machine, in the example form, of a computer system within which a set of instructions, for causing the machine to perform any one or more of the methodologies discussed herein, may be executed.

FIG. 17 depicts a diagrammatic representation of a machine, in the example form, of a computer system within which a set of instructions, for causing the machine to perform any one or more of the methodologies discussed herein, may be executed.

In the example of FIG. 17, the computer system includes a processor, memory, non-volatile memory, and an interface device. Various common components (e.g., cache memory) are omitted for illustrative simplicity. The computer system 1700 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer

1700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 17 reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 552 6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method of authenticating devices in a wireless power delivery environment, the method comprising:
   receiving a request for wireless power initiated by a device in the wireless power delivery environment, wherein the request includes a client identification (ID);
   communicating a query including the client ID to a remote authentication platform for obtaining an authentication status of the device;
   receiving the authentication status of the device,
       wherein the authentication status includes an authentication period during which the device is authenticated; and
   when the authentication status indicates that the device is authenticated, providing wireless power to the device during the authentication period in accordance with a power delivery schedule.

2. The method of claim 1, wherein the authentication period comprises one or more of a start time and an end time or a start time and a duration.

3. The method of claim 1, further comprising generating the query including the client ID.

4. The method of claim 1, further comprising:
   provisioning the device on the authentication platform, wherein the provisioning includes registering the client ID.

5. The method of claim 1, further comprising:
   providing a notification including an information allowance selection to the device;
   collecting information contained in the information allowance selection; and
   registering the collected information with the authentication platform.

6. The method of claim 5, wherein the notification includes a webpage enabling the device to directly register with the authentication platform, and wherein the allowance section comprises privacy setting configurations.

7. The method of claim 6, wherein the notification requires entry of an access code.

8. The method of claim 7, wherein the access code comprises a code that is one or more of printed on a receipt, printed on a product, scan-able, or activated at a point-of-sale.

9. The method of claim 1, wherein providing the wireless power includes transmitting energy as one or more of radio frequency (RF) signals, pressure waves, or photonic waves.

10. The method of claim 1, further comprising:
    collecting usage patterns associated with the device; and
    updating the power delivery schedule based on the usage patterns.

11. An apparatus comprising:
    one or more computer readable storage media; and
    program instructions stored on the one or more computer readable storage media, wherein the program instruction, when executed by a processing system, direct the processing system to:
        process a request for wireless power initiated by a device in the wireless power delivery environment to identify a client identification (ID) corresponding to the device;
        communicate a query including the client ID to a remote authentication platform for obtaining an authentication status of the device;
        receive the authentication status of the device,
            wherein the authentication status includes an authentication period during which the device is authenticated; and
        when the authentication status indicates that the device is authenticated, modify a power delivery schedule to include the device during the authentication period.

12. The apparatus of claim 11, wherein the authentication period comprises one or more of a start time and an end time or a start time and a duration of the authentication period.

13. The apparatus of claim 11, wherein the instructions, when executed by a processing system, further direct the processing system to generate the query including the client ID.

14. The apparatus of claim 11, wherein the instructions, when executed by a processing system, further direct the processing system to:
    provision the device on the authentication platform, wherein the provisioning includes registering the client ID.

15. The apparatus of claim 11, wherein the instructions, when executed by a processing system, further direct the processing system to:
    provide a notification including an information allowance selection to the device;
    collect information contained in the information allowance selection; and
    register the collected information with the authentication platform.

16. The apparatus of claim 15, wherein the notification includes a webpage enabling the device to directly register with the authentication platform, and wherein the allowance section comprises privacy setting configurations.

17. The apparatus of claim 16, wherein the notification requires entry of an access code.

18. The apparatus of claim 17, wherein the access code comprises a code that is one or more of printed on a receipt, printed on a product, scan-able, or activated at a point-of-sale.

19. The apparatus of claim 11, wherein providing the wireless power includes transmitting energy as one or more of radio frequency (RF) signals, pressure waves, or photonic waves.

20. A wireless power transmission system, comprising:
    an adaptively-phased antenna array having multiple radio frequency (RF) transceivers;
    control circuitry configured to:
        process a request for wireless power initiated by a device in a wireless power delivery environment to identify a client identification (ID) corresponding to the device;
        communicate a query including the client ID to a remote authentication platform for obtaining an authentication status of the device;
        receive the authentication status of the device, wherein the authentication status includes an authentication period during which the device is authenticated; and
        when the authentication status indicates that the device is authenticated, modify a power delivery schedule to include the device during the authentication period.

* * * * *

UNITED STATES PATENT AND TRADEMARK OFFICE
CERTIFICATE OF CORRECTION

Page 1 of 1

PATENT NO. : 10,181,760 B2
APPLICATION NO. : 15/297721
DATED : January 15, 2019
INVENTOR(S) : Hatem Zeine et al.

It is certified that error appears in the above-identified patent and that said Letters Patent is hereby corrected as shown below:

In the Specification

Column 28, Line 35, delete "552 6" and insert --¶6--

Signed and Sealed this
Sixteenth Day of July, 2019

Andrei Iancu
*Director of the United States Patent and Trademark Office*